Oct. 22, 1963 A. A. FOWLER, JR ETAL 3,107,396
VACUUM SIGN PRODUCING APPARATUS
Filed April 26, 1961 2 Sheets-Sheet 1
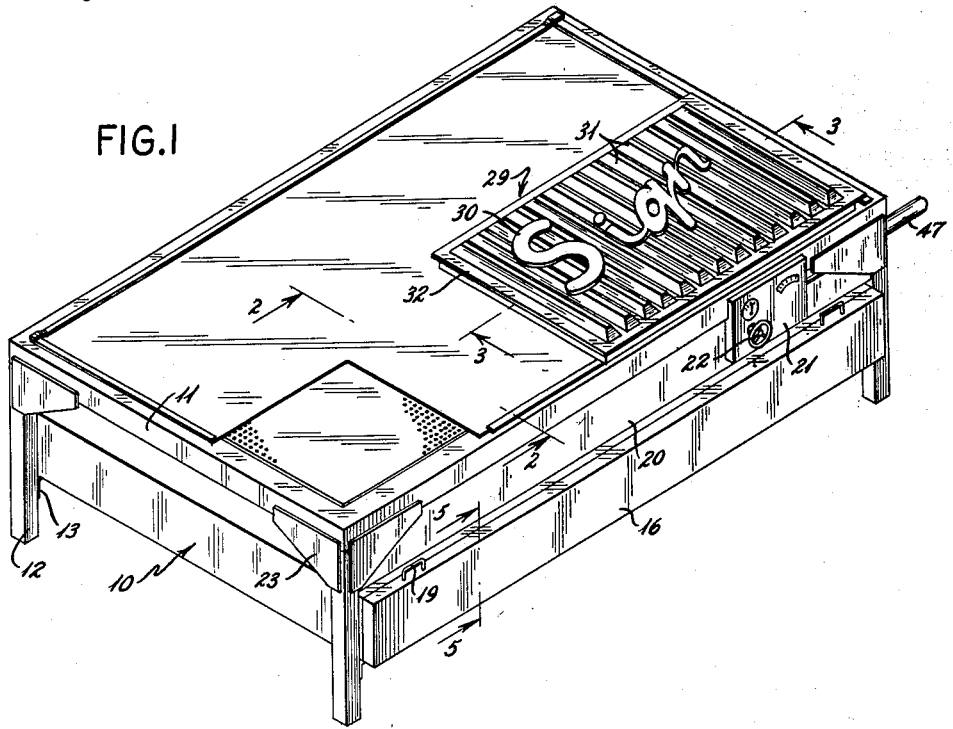
FIG.1
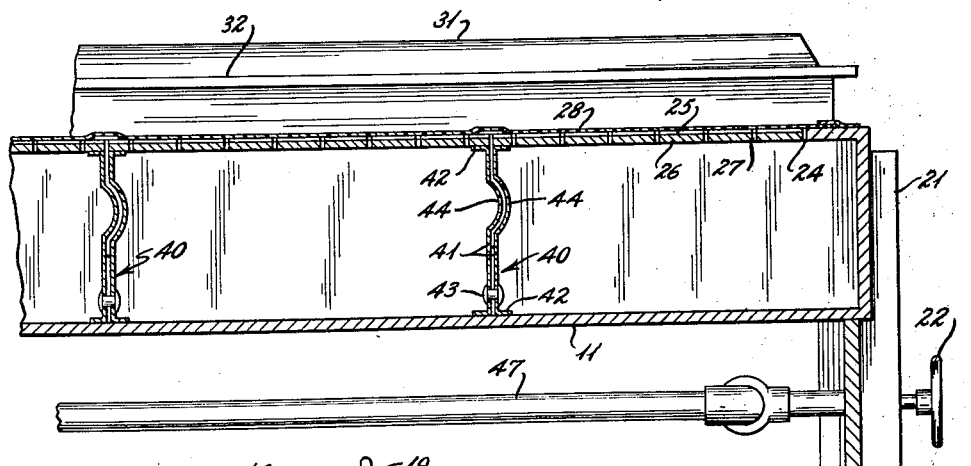
FIG.2
FIG.5
INVENTORS
AUBREY A. FOWLER JR.
HENRY O. McKEE
BY
ATTORNEY

United States Patent Office 3,107,396
Patented Oct. 22, 1963

3,107,396
VACUUM SIGN PRODUCING APPARATUS
Aubrey A. Fowler, Jr., Fairmont, N.C., and Henry O. McKee, 203 Morro St., Fairmont, N.C.
Filed Apr. 26, 1961, Ser. No. 105,654
3 Claims. (Cl. 18—19)

This invention relates to the manufacture of articles of various kinds from various materials including from plastics and by the application of heat and suction and also to the equipment by which such products are heated and subjected to suction.

The invention relates particularly to the production of plastic signs or other articles and to apparatus by means of which a specific sign may be produced by the subjection of the plastic to heat and suction pressure to cause it to conform to a mold in which it is produced.

Prior apparatus has been expensive, cumbersome, massive, difficult to handle and maintain, and required a skilled attendant to use, the principal objections being the initial cost, the upkeep and the amount of time required in the use of the apparatus.

It is an object of the invention to provide a simple and practical apparatus with a mold therefor to cause a sheet of plastic to conform intimately with such mold as well as to provide such a device in connection with a heating means and all at a reasonable cost.

Another object of the invention is to provide apparatus for forming sheet plastic including means for heating the plastic prior to its being subjected to the forming device and then for applying suction and pressure to the plastic over a mold for producing the finished articles.

Figure 3:
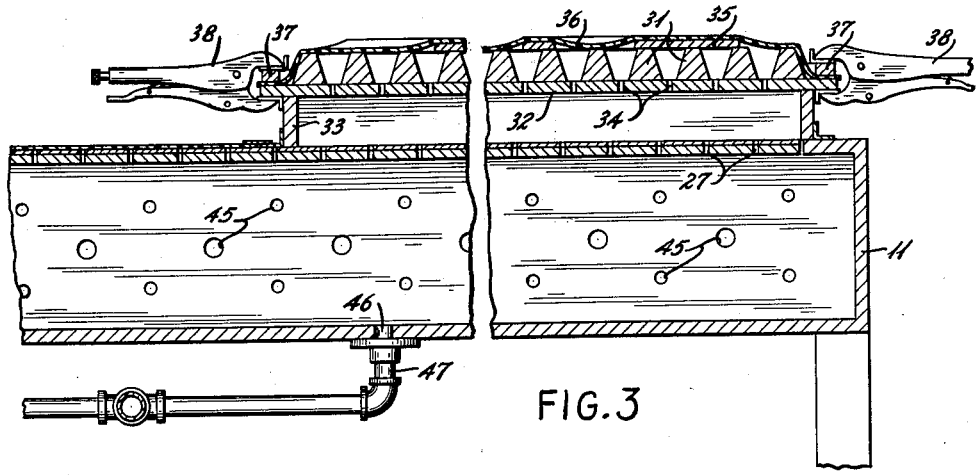
Figure 4:
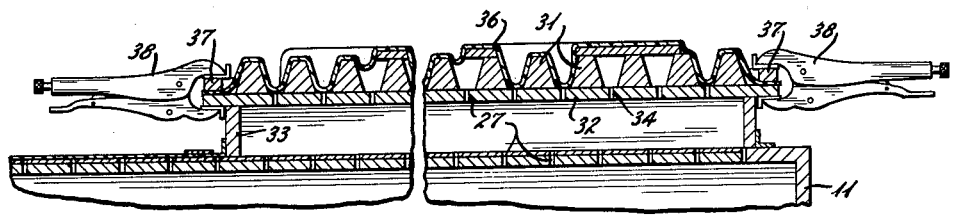
Figure 6:
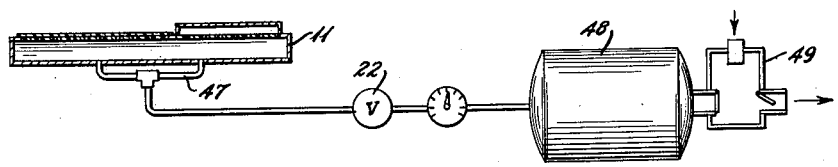

Other objects and advantages of the invention will be apparent from the following description taken in conjunction with the accompanying drawing wherein:

FIG. 1 is a perspective illustrating one application of the invention;

FIG. 2, an enlarged fragmentary vertical section on the line 2—2 of FIG. 1;

FIG. 3, an enlarged fragmentary vertical section through the tank and mold on the line 3—3 of FIG. 1 and illustrating one step in the operation;

FIG. 4, a view similar to that of FIG. 3 illustrating the next step in the operation;

FIG. 5, an enlarged fragmentary vertical detail section on the line 5—5 of FIG. 1; and FIG. 6, a schematic view illustrating means for applying suction to the plastic.

Briefly stated the present invention is a vacuum sign producing apparatus comprising a tank mounted on supports or legs and an oven operatively associated therewith. The upper surface of the tank is provided with small equally spaced openings through which air may be exhausted. One or more hollow molds are adapted to be placed on the tank and the remainder of the top surface of the tank is covered by a sheet of relatively stiff plastic material. A sheet of plastic to be molded is preheated in the oven and is then placed over each of the molds and gripped thereto after which the air in the tank is exhausted so that atmospheric pressure will collapse the preheated plastic and cause it to conform to the shape of the molds. The partial vacuum is maintained until the plastic has cooled and has assumed a permanent set.

With continued reference to the drawing, the present invention comprises the production of a mold, the heating of plastic, placing of the plastic in contact with the mold and then subjecting it to pressure to cause it to conform to the mold as it hardens. The apparatus includes an oven 10 for supplying heat and a tank 11 for subjecting the mold to a vacuum, both the oven and the tank being mounted on legs or posts 12. The oven is supported by brackets 13 attached to each of the legs or posts 12 so that the oven may be removed. The oven 10 as illustrated in FIG. 5 is composed of an outer shell 14 with insulation 15 on the interior thereof and is provided with a door 16 having insulation 17 and such door is mounted by means of hinges 18 to the shell 14. The door is provided with manipulating handles 19 so that it may be opened for affording access to its interior. The oven may be heated in any desired manner and the temperature of the oven controlled by conventional controls not shown.

A mounting panel 20 is located between the oven 10 and the tank 11 at the front of the device and on this panel is a control panel 21 with a control valve 22. Gussets 23 are provided for reinforcing the connection between each of the posts 12 and the tank 11, with such gussets overlying the panel 20 at the front of the device. The bottom and walls of the tank 11 are fabricated from a single sheet of steel with welded corners and the top of the walls have an inturned flange to provide an opening 24 in which is mounted a pegboard 25 having a supporting and reinforcing base 26 preferably adhesively connected thereto. Relatively small openings 27 are spaced over the base and pegboard through which suction is distributed. A thin, relatively stiff plastic sheet 28 overlies all the openings 27 except those beneath a hollow mold 29 which includes a sign 30 supported by ribs 31. The mold can be of any desired size and configuration and is composed of a plate or platen 32 carried on upright supporting walls 33.

The plate 32 has a series of closely spaced openings 34 between the ribs 31 in order that suction within the tank 11 will be exerted through the openings 27 and 34 about the sign 35 and in contact with a sheet of preheated plastic 36 which caused the plastic to be drawn between the ribs 31 into the configuration illustrated in FIG. 4. In order to hold the edges of the plastic being formed, a press ring 37 is placed thereon adjacent to the periphery of the plate 32 and is clamped thereto by a series of clamping tools 38 such as vice grip pliers to prevent the loss of vacuum beneath the plastic sheet.

In the construction of the tank 11 a series of braces or reinforcing members 40 extend lengthwise of the tank and are equally spaced across the width thereof and each of such brackets comprise a pair of channel members 41, having flanges 42 with the web portions being connected by a rivet or other fastener 43. The web portion of each of the channels has a cooperating arcuate portion 44 and such web portions are spaced apart a pre-determined distance so that a nail may be driven between the web portions and around the arcuate portion to prevent the nail from being easily withdrawn. In this manner the pegboard is fastened to the brackets 40 to maintain such pegboard in fixed relation. Each of the brackets 40 is provided with a plurality of apertures 45 to permit air to flow between the compartments formed by such brackets.

Air is adapted to be exhausted from the tank 11 through openings 46 in the bottom of the tank connected to a vacuum line 47 in a communication with a vacuum tank 48 under the influence of a pneumatic discharge pump 49. The valve 22 is interposed in the line 47 between the tank 11 and the vacuum tank 48 so that when the preheated plastic has been placed over the mold and clamped in position the valve 22 is opened and air in the tank 11 is exhausted into the vacuum tank 48. The greater force of air in the atmosphere will cause the plastic to conform to the configuration of the mold where it is maintained until the plastic has cooled and assumed a permanent set.

In the operation of the press one or more hollow molds are placed on the pegboard or the top of the tank and the remaining area of the pegboard is closed by the sheet of plastic 28. The outer edges of such sheet of plastic are taped to the tank to prevent the loss of vacuum and similarly the edges of the mold are taped to the tank 11 to prevent loss of vacuum around the base of the molds. A plastic sheet which is to be formed is cut generally to the overall size of the mold and then placed in the oven and pre-heated to a temperature of approximately 300° F. after which the plastic is removed from the oven, placed on the mold and clamped thereto. The valve 22 is then opened to exhaust the air from the tank 11 and the mold 29 to cause the heated plastic to conform to the configuration of the mold.

It will be obvious to those skilled in the art that various changes may be made in the invention without departing from the spirit and scope thereof and, therefore, the invention is not limited by that which is illustrated in the drawing and described in the specification, but only as indicated in the accompanying claims.

What is claimed is:

1. Sign producing apparatus comprising an air tank, means for exhausting the air from said tank, the upper surface of said tank having a plurality of openings therethrough, one or more removable forming elements mounted on said upper surface in airtight relation, each of said forming elements having a top with multiple openings therethrough and side walls providing an air header in communication with some of the openings in said upper surface, cover means for the upper surface of said tank unoccupied by said forming elements, means for clamping a sheet of deformable material onto the top of said forming element whereby when the air is exhausted from said tank the sheet of material will be formed about the configuration of said forming elements by external atmospheric pressure.

2. In a sign producing apparatus, the combination of a hollow air tank and one or more forming elements removably mounted thereon, said air tank having a plurality of openings in its upper surface, means for exhausting the air from said tank, a cover of non-deformable material for the upper surface of said tank, portions of said cover being selectively removable to accommodate said forming elements, each of said forming elements including side walls and a top, said top being of a desired configuration and having multiple openings therethrough, said side walls and top providing an air header in communication with some of the openings in said tank, each of said forming elements being adapted removably to receive a sheet of deformable material thereon whereby when the air is exhausted from said tank the sheet of material will be molded about said forming elements.

3. The structure of claim 2 including means for heating said deformable material before mounting it on said forming elements.

References Cited in the file of this patent

UNITED STATES PATENTS

| | | |
|---|---|---|
| 2,354,916 | Hurt | Aug. 1, 1944 |
| 2,660,757 | Smith et al. | Dec. 1, 1953 |
| 2,781,077 | Dovidio | Feb. 12, 1957 |
| 2,836,852 | Butzko | June 3, 1958 |
| 3,004,289 | Missbach | Oct. 17, 1961 |

FOREIGN PATENTS

| | | |
|---|---|---|
| 1,091,316 | Germany | Oct. 20, 1960 |